(12) United States Patent
Monney

(10) Patent No.: US 7,321,357 B1
(45) Date of Patent: Jan. 22, 2008

(54) XY ROLLER FOR SCROLLING ALONG TWO AXES

(75) Inventor: Patrick Monney, Mex (CH)

(73) Assignee: Logitech Europe S.A. (CH)

( * ) Notice: Subject to any disclaimer, the term of this patent is extended or adjusted under 35 U.S.C. 154(b) by 482 days.

(21) Appl. No.: 10/842,988

(22) Filed: May 10, 2004

(51) Int. Cl.
*G09G 5/00* (2006.01)

(52) U.S. Cl. .......................... 345/156; 345/84

(58) Field of Classification Search ........ 345/156–169, 345/184
See application file for complete search history.

(56) References Cited

U.S. PATENT DOCUMENTS 5,446,481 A   8/1995   Gillick et al.
6,388,655 B1 *  5/2002   Leung .................... 345/157
6,930,959 B2 *  8/2005   Narayanaswami .......... 368/69

FOREIGN PATENT DOCUMENTS

JP   2002-366300   12/2002

* cited by examiner

*Primary Examiner*—Richard Hjerpe
*Assistant Examiner*—Jean Lesperance
(74) *Attorney, Agent, or Firm*—Townsend and Townsend and Crew LLP

(57) ABSTRACT

An input device is provided that is configured to dynamically select and control y-scrolling and x-scrolling. The input device includes a roller wheel configured to be rotated by a user; an encoder configured to encode rotations of the roller wheel; and a sensor coupled to the roller wheel, wherein the sensor is configured to control the encoder to scroll a graphical object along a first axis if the sensor is in a first state, and the sensor is configured to control the encoder to scroll the graphical object along a second axis if the sensor is in a second state.

24 Claims, 6 Drawing Sheets

XY ROLLER FOR SCROLLING ALONG TWO AXES

BACKGROUND OF THE INVENTION

The present invention pertains generally to input devices and more particularly pertains to an input device having a roller device configured to provide dynamically selectable y-scrolling and x-scrolling.

Traditional input devices, such as mice and track balls, do not provide x-scrolling of graphical displays displayed on a monitor. X-scrolling refers generally to the left and right (or horizontal) scrolling directions of graphical objects displayed on a monitor as compared with the up and down (or vertical) scrolling directions. The up and down scrolling directions on a monitor are traditionally referred to as the y-scrolling directions. Scrolling control along the x-axis of a monitor is desired for scrolling objects, such as a page of text or the like, that extend beyond the horizontally displayable width of the monitor. Traditionally, x-scrolling has been controlled by positioning a pointer on a left or right x-scrolling button and "clicking" on one of the buttons, or positioning the pointer on an x-scrollbar and selecting the x-scrollbar with the pointer and then dragging the x-scrollbar in an x-axis direction. These traditional x-scrolling techniques require multiple user manipulations of traditional pointing devices and graphical user interface (GUI) tools to effect x-scrolling and tend to be time consuming and awkward.

Other controller designs for controlling scrolling of graphical objects include designs discussed in U.S. Pat. No. 5,446,481, filed Aug. 29, 1995, titled "Multidimensional Hybrid Mouse for Computers,". owned by Mouse System Corporation.

Other control devices designed to control scrolling include devices described in Patent Abstract of Japan, Publication No. 2002-366300, titled Mouse With Scroll Functions, owned by Toshiba Corp.

Accordingly, it is desirable to have an improved input device that provides x-scrolling and that is easy to use and manufacture.

BRIEF SUMMARY OF THE INVENTION

The present invention pertains generally to input devices and more particularly pertains to an input device having a roller device configured to provide dynamically selectable scrolling along a first axis and a second axis. Scrolling along the first axis or second axis is selected by a user by pressing on a roller wheel to activate a switch that configures the input device to scroll graphical objects along the first axis or along the second axis.

According to one embodiment, the input device includes a roller wheel configured to be rotated and depressed by a user; an encoder configured to encode rotations of the roller wheel; and a sensor coupled to the roller wheel, wherein the sensor is configured to control the encoder to scroll a graphical object along a first axis if the sensor is in a first state, and the sensor is configured to control the encoder to scroll the graphical object along a second axis if the sensor is in a second state. The first axis and second axis are in different directions. According to a specific embodiment, the first axis is a vertical axis of a monitor, and the second axis is a horizontal axis of the monitor. According to another specific embodiment, the input device further includes a second sensor configured to change an operational characteristic of the input device from a first characteristic to a second characteristic if the second switch is activated by the user pressing on the roller wheel, wherein the second switch has a first state and a second state, and wherein the first mentioned sensor is configured to enter its second state if the roller wheel is pressed down a first distance by the user, and the second sensor is configured to enter the second state if the roller wheel is pressed down a second distance greater than the first distance. According to a specific embodiment, the first characteristic includes x-y control and the second characteristic includes scrolling. According to another specific embodiment, the second characteristic includes at least one of scrolling, selection of a graphical object, highlighting, menu selection, and a user configurable function.

According to another embodiment, an input device includes a roller wheel configured to be rotated by a user; an encoder configured to encode rotations of the roller wheel; and a force detection device coupled to the roller wheel, wherein the force detection device is configured to control the encoder to scroll a graphical object along a first axis if the force detection device detects a first force in a first range of forces, and the force detection device is configured to control the encoder to scroll a graphical object along a second axis if the force detection device detects a second force in a second range of forces, wherein the forces in the first range of forces are greater than the forces in the second range of forces.

According to another embodiment, a method is provided for dynamically selecting and scrolling graphical objects displayed on a monitor along a first axis of the monitor or a second axis of the monitor. The method includes scrolling the graphical object along a first axis if a roller wheel is rotated and a control sensor is in a first state; and scrolling the graphical object along a second axis different from the first axis if the roller wheel is rotated and the control sensor is in a second state. According to a specific embodiment, the method further includes toggling the control sensor from the first state to the second state if the roller wheel is pressed and released by a user. According to another specific embodiment, the method further includes toggling the control sensor from the second state to the first state if the roller wheel is pressed and released by the user subsequent to the first mentioned press and release of the roller wheel. According to another specific embodiment, the first axis is a vertical axis of the monitor, and the second axis is a horizontal axis of the monitor.

For a further understanding of the nature and advantages of the invention, reference should be made to the following detailed description taken in conjunction with the accompanying figures and claims.

DETAILED DESCRIPTION OF THE INVENTION

Figure 1A:
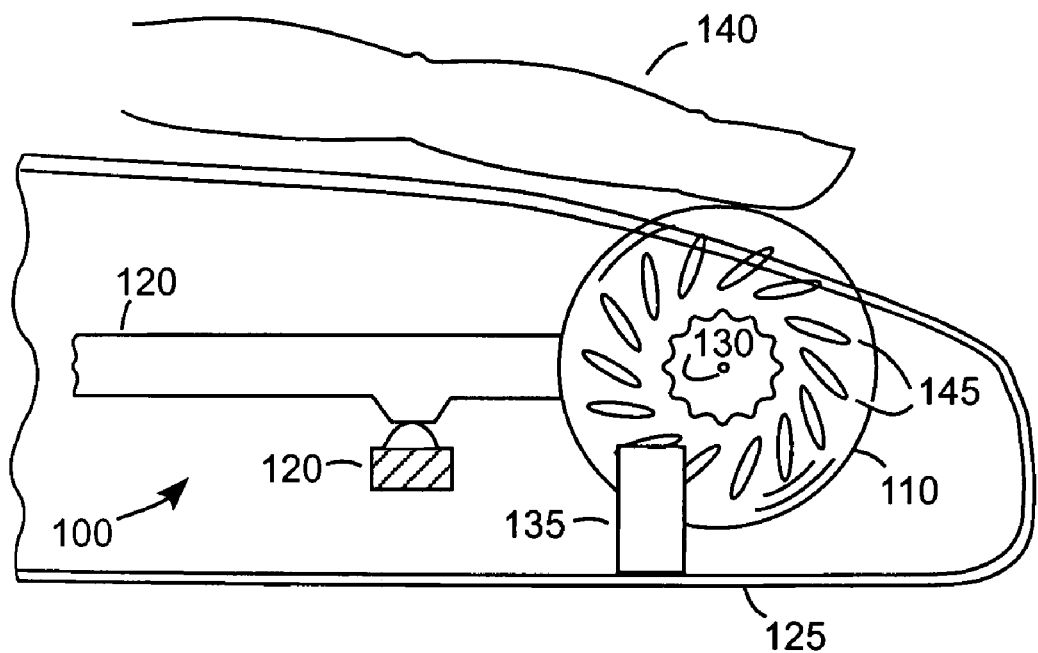
FIGS. 1A and 1B are simplified schematics of a roller device according to an embodiment of the present invention.
Figure 1B:
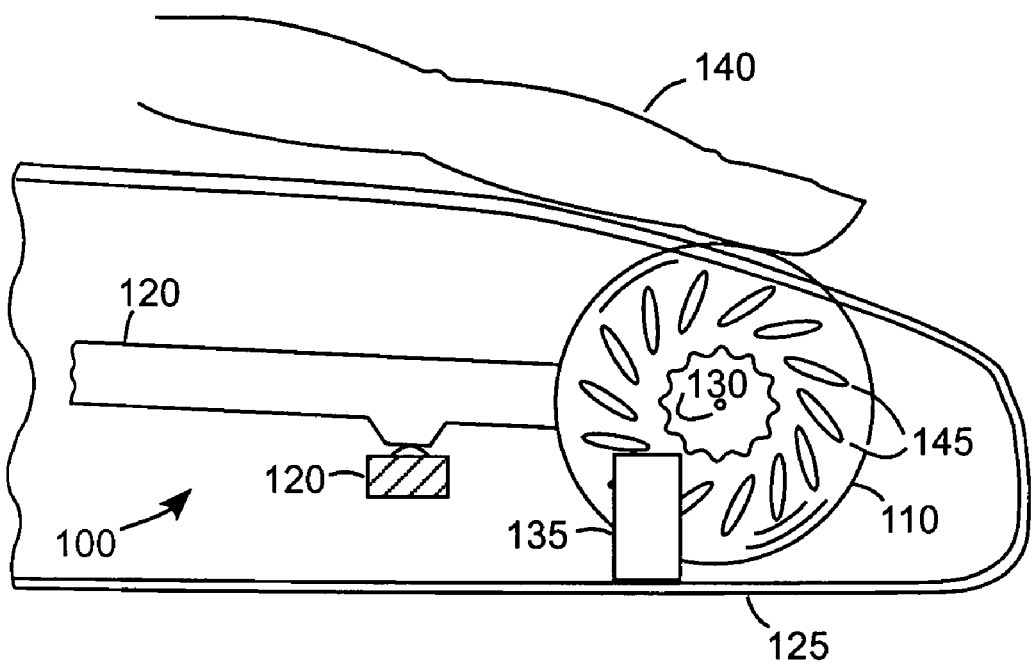

FIGS. 1A and 1B are simplified schematics of a roller device 100 that may form a portion of an input device according to an embodiment of the present invention. Roller device 100 includes a roller wheel 110, a roller support 115, and a switch 120. The roller device may be mounted in a case 125 that may be the outer case of an input device, such as a mouse, a trackball, keyboard, number pad, touch pad or the like. The roller wheel is configured to be rotated about a central axis 130 by a user using a finger 140, for example, to create a rotation force on the roller wheel. Roller wheel rotations may be encoded by an encoder device 135. Encoder device 135 may be an opto-electronic encoder, an electro-mechanical encoder, or the like. For example, if encoder device 135 is an opto-electronic device, such as a photoresistor, an LED (not shown) may be configured to illuminate slots 145 in the roller wheel hub and the transmitted illumination may be detected by the opto-electronic device (sometimes referred to in the art as a photodetector). The encoder may be configured to encode the increase and decrease in the transmitted illumination intensity through the slots to encode the roller wheel rotations. The encoded roller wheel rotations of the roller wheel may be configured to control the scrolling of graphical objects, such as pages of text or the like, displayed on a display, such as a computer display, a display of a personal digital assistant, a camera display, or the like.

Figure 2:
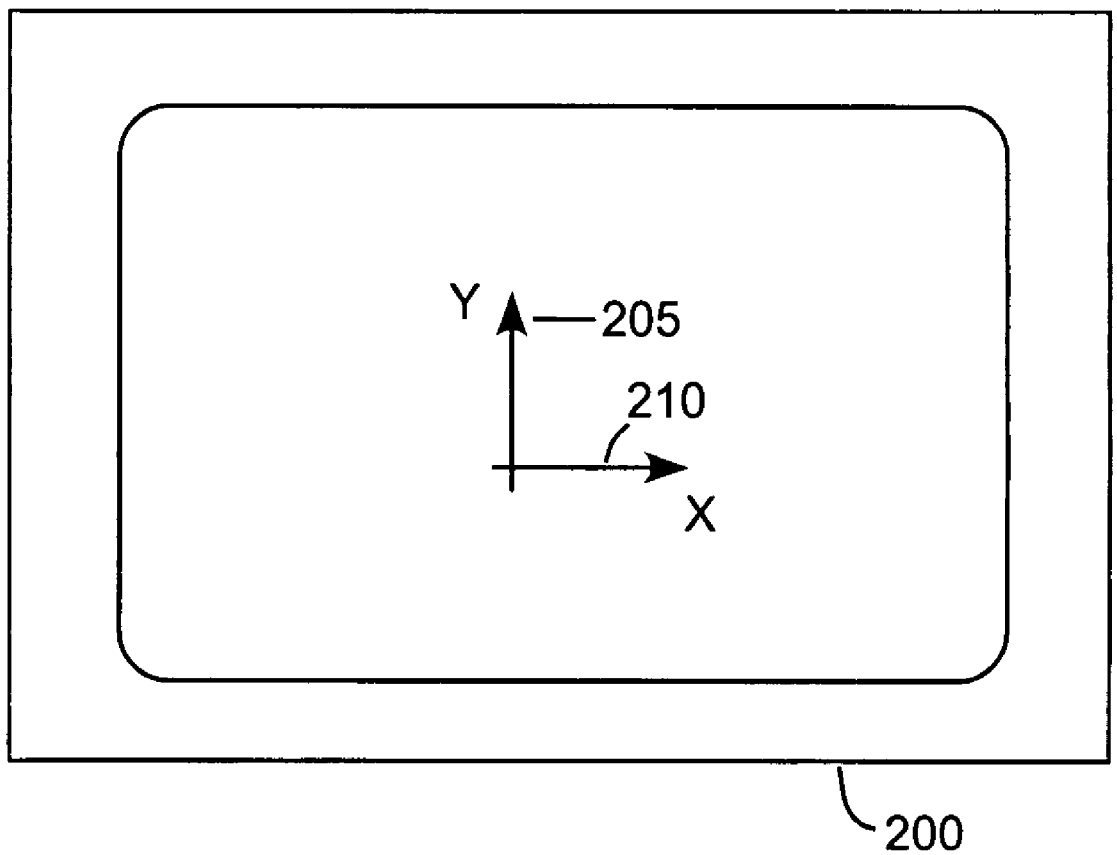
FIG. 2 is a simplified schematic of a computer monitor on which the y- and x-scrolling directions are indicated by a set of arrows.

According to one embodiment, roller wheel 110 is configured to be pushed down and released by a user using, for example, a middle finger 140 to change switch 120 between first and second states. That is, if the switch is in its first state, the switch is changed to the second state by pressing and releasing the roller wheel, and is switched back to the first state by pressing and releasing the roller wheel an additional time. In its first state, switch 120 configures encoder 135 to encode roller wheel rotations for scrolling of graphical objects along a first axis. In its second state, switch 120 configures encoder 135 to encode roller wheel rotations for scrolling of graphical objects along a second axis. The first axis and second axis are in different direction. The first axis may be the y-axis (i.e., up and down directions) of a monitor configured to display the graphical objects, and the second axis may be the x-axis (i.e., left and right directions) of the monitor. Scrolling of graphical objects along the y-axis is referred to as y-scrolling, and scrolling of graphical objects along the x-axis is referred to as x-scrolling. FIG. 2 is a simplified schematic of a computer monitor 200 on which the y- and x-scrolling directions are indicated by arrows 205 and 210, respectively.

According to one embodiment, switch 120 is in the first state if the switch is in its neutral position (i.e., not depressed, such as shown in FIG. 1A), and the switch is in the second state if the switch is depressed. FIG. 1B shows roller wheel 110 in a depressed position under the force of a user's finger and shows switch 120 also in a depressed position. From its depressed position, the roller wheel may be returned to the neutral position by a restoring force applied by switch 120, roller support 115 or by other means not shown, such as return springs or the like. Similar to embodiments described above, in the first state (neutral position), switch 120 configures encoder 135 to control scrolling along a first axis (e.g., vertical axis), and in its second state (depressed), switch 120 configures encoder 135 to control scrolling along a second axis (e.g., horizontal axis).

According to one embodiment, switch 120 is a button device, such as a pancake button that is activated (e.g., second state) by a user pressing and releasing the roller wheel or by pressing and holding the roller wheel down, and is deactivated (e.g., first state) by a user pressing and releasing the roller wheel a second time, or leaving the roller wheel in the raised neutral position.

According to another embodiment, switch 120 is a double-action switch having a first state, a second state, and a third state. Switch 120 may be the Light Touch Switch™ (part number EVQ PWB A15) manufactured by Tsuyama Matsushita Electric Co., Ltd. of Japan or other double-action switch. Switch 120 in the first state configures encoder 135 to control scrolling of graphical objects along the first axis and in the second state, the switch configures the encoder to control scrolling of graphical objects along the second axis. Switch 120 in the third state may configure an input device to change a first operational characteristic to a second operational characteristic. For example, an x-y controller of an input device may be configured to adopt a first operational characteristic if the switch is in the first or second state and adopt a second operational characteristic if the switch is in the third state. The first operational characteristic of an x-y controller may include controlling x-y motion of a graphical object, such as a pointer, and the second operational characteristic of the x-y controller may include controlling scrolling of graphical objects configured to be scrolled, such as text pages, figures, diagrams and the like that extend beyond the horizontally displayable width of the monitor. Alternatively, the second characteristic may include the selection of graphical objects for dragging, highlighting, menu selection, a user configurable function, or other function typically associated with the press (or click) of a roller wheel. Those of skill in the art are familiar with the functions typically associated with the click of roller wheel of control devices, such as a mouse or the like. X-Y controllers may include roller balls and their associated encoders, optical encoders or the like. Those of skill in the art are familiar with x-y controllers and therefore these controllers will not be described in detail.

The first activation state of switch 120 may be selected by leaving the roller wheel in the neutral position as the roller wheel is rotated. The second activation state of switch 120 may be selected by pushing the roller wheel down a first distance. And the third activation state may be selected by pushing the roller wheel down an additional second distance. A first resistance force may be provided to the roller wheel to inhibit the roller wheel from being pressed down the first distance, for example, if a user rotates the roller wheel and desires that the switch remain in its first state. As the user pushes the roller wheel into the first distance, a second resistance force greater than the first resistance force may be applied to the roller wheel. The second resistance force provides tactile feedback to the user to indicate that if the roller wheel is pushed further, the second state will be activated. As the user pushes the button down into the second distance, a third resistance force greater than the first and second resistance forces may be applied to the roller wheel. The third resistance force provides a tactile feedback to the user to indicate that if the roller wheel is pushed further, the third state will be activated. In addition to, or as a substitute for increasing resistance forces, pulsed forces may be applied to the roller wheel to indicate activation of the different activation states. Additionally, audible feedback signals, such as clicks or beeps, may be used to indicate activation of the different activation states.

Figure 3A:
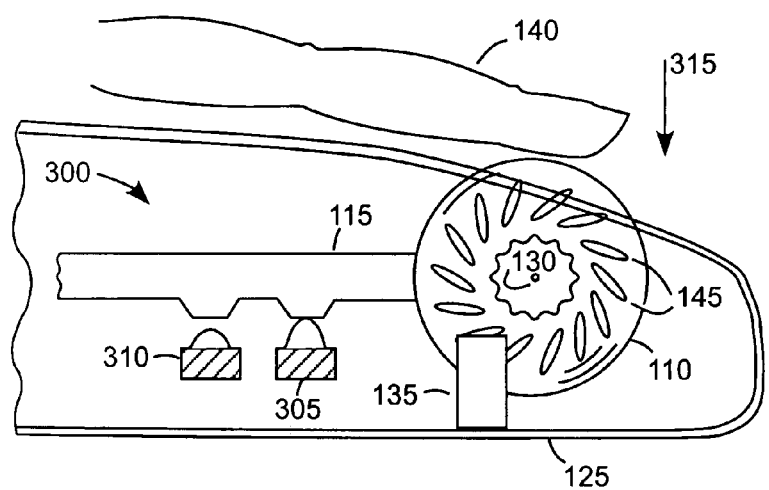
FIG. 3A is a simplified schematic of a roller device according to another embodiment of the invention.
Figure 3B:
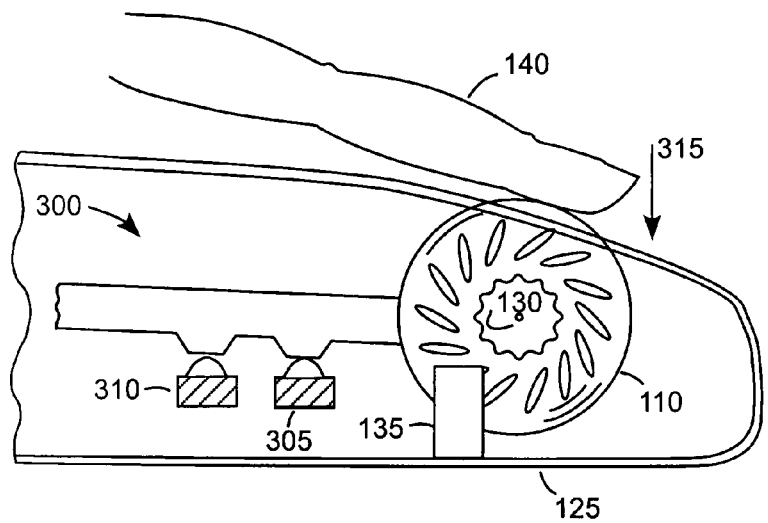
FIG. 3B shows the roller wheel in a first depressed configuration and the first switch in an activated configuration.
Figure 3C:
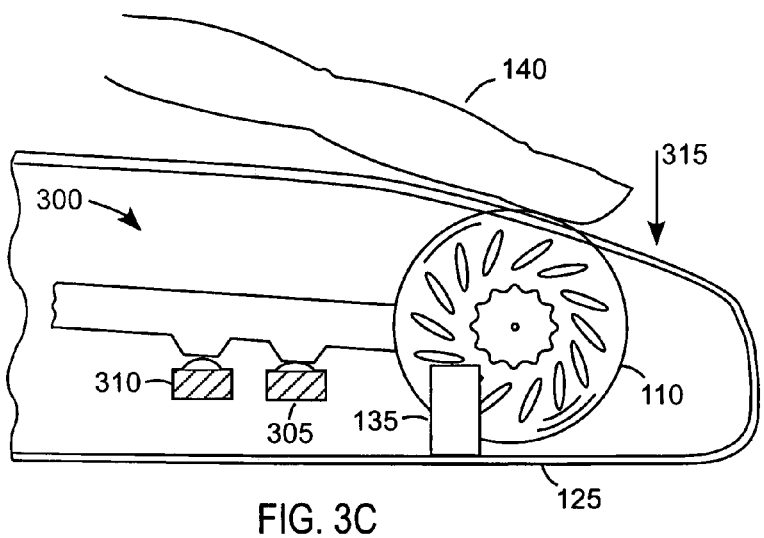
FIG. 3C shows the roller wheel in a second depressed configuration and the second switch in an activated configuration.

FIG. 3A is a simplified schematic of a roller device 300 according to another embodiment of the invention. Roller device 300 differs from roller device 100 in that roller device 300 includes a first switch 305 and a second switch 310. The second switch may have a longer activation length than the first switch. That is, the first switch may be activated (i.e., enter its second state) before the second switch is activated (i.e., enter its second state) as roller wheel 110 is pressed downward (indicated by arrow 315). The first switch may be toggled between its first state and second state by pressing and releasing the roller wheel. Alternatively, the first switch may toggle between its first state and its second state by pushing the roller wheel down and holding the roller wheel in the downward position, and the switch may toggle from its second state to its first state by releasing the roller wheel to return the roller wheel to its neutral position. FIG. 3B shows roller wheel 110 in a first depressed configuration and first switch 305 in its second state (or activated state), and FIG. 3C shows roller wheel 110 in a second depressed configuration and second switch 310 in its second state (or activated state).

Figure 3D:
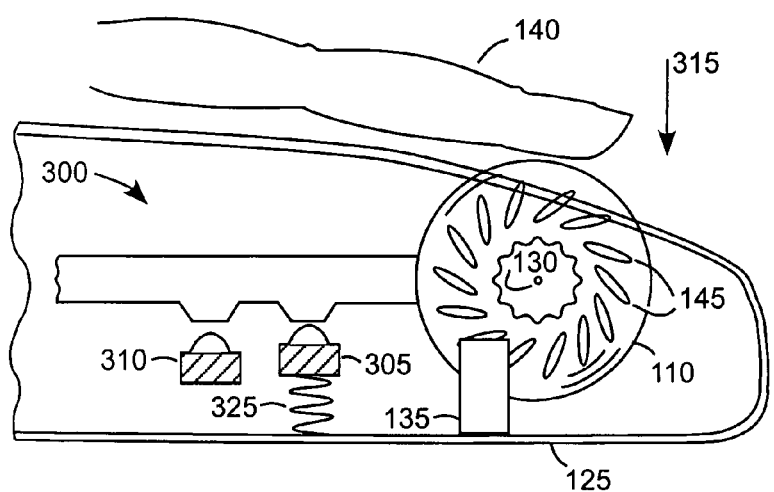
FIG. 3D is a simplified schematic of a roller device according to another embodiment of the invention.
Figure 3E:
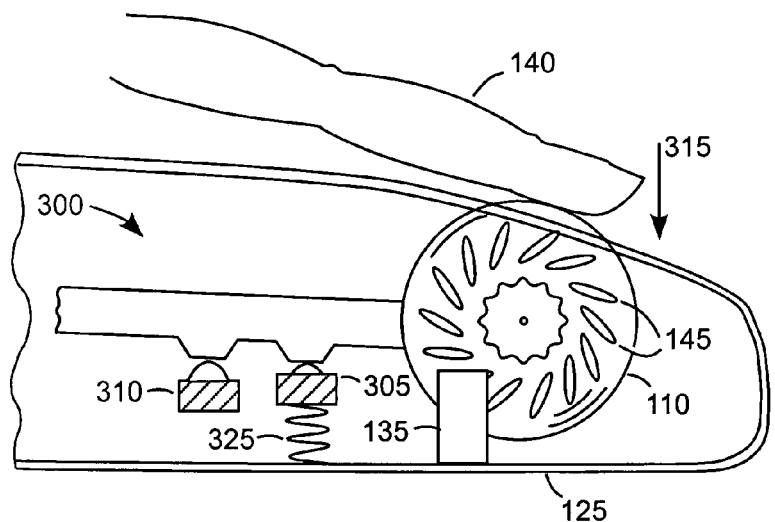
FIG. 3E shows the roller wheel in a first depressed configuration and the first switch in an activated configuration.
Figure 3F:
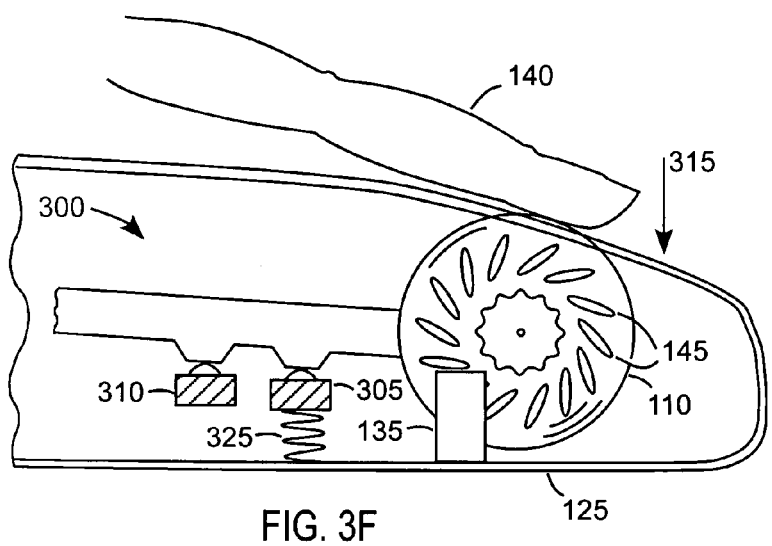
FIG. 3F shows the roller wheel in a second depressed configuration and the second switch in an activated configuration.

FIG. 3D is a simplified schematic of a roller device 300' according to another embodiment of the invention. Roller device 300' differs from roller device 300 in that the first switch 305 is coupled to a compression device 325 (such as spring device, a solenoid device or the like) and may be disposed in a relatively higher position than second switch 310 in the switch's neutral positions. Compression device 325 is configured to compress, for example, after switch 305 is activated or as switch 305 is activated. Similar to embodiments, described above, after switch 305 is activated, switch 310 may be activated by a user pressing the roller wheel downward an additional distance. FIGS. 3E and 3F show the roller wheel increasing pressed downward by a user and show the compression device compressed by this pressing. Further, switches 305 and 310, according to the embodiment currently described, may have similar activation strokes. That is, each switch might be activated by approximately the same depression, compression or the like.

In its first state, first switch 305 may configure encoder 135 to control scrolling along a first axis (e.g., y-axis) as the roller wheel is rotated. In its second state, first switch 305 may configure encoder 135 to control scrolling along a second axis (e.g., x-axis) as the roller wheel is rotated. Second switch 310 in its second state may configure an input device (e.g., a mouse device) to change a first operational characteristic to a second operational characteristic. For example, an x-y controller of an input device may be configured to adopt a first operational characteristic if second switch 310 is in its first state and adopt a second operational characteristic if the second switch is in its second state. As described above, the first operational characteristic of an x-y controller may include controlling x-y motion of a graphical object, such as a pointer, and the second operational characteristic of the x-y controller may include controlling scrolling of graphical objects, such as text pages, figures, diagrams and the like that extend beyond the vertical and horizontal display width of the monitor. Alternatively, the second characteristic may include the selection of graphical objects, for example, for dragging, highlighting, menu selection, a user configurable function, or other function typically associated with the press (or click) of a roller wheel. Those of skill in the art are familiar with the functions typically associated with the click of roller wheel of control devices, such as mice or the like.

Figure 4:
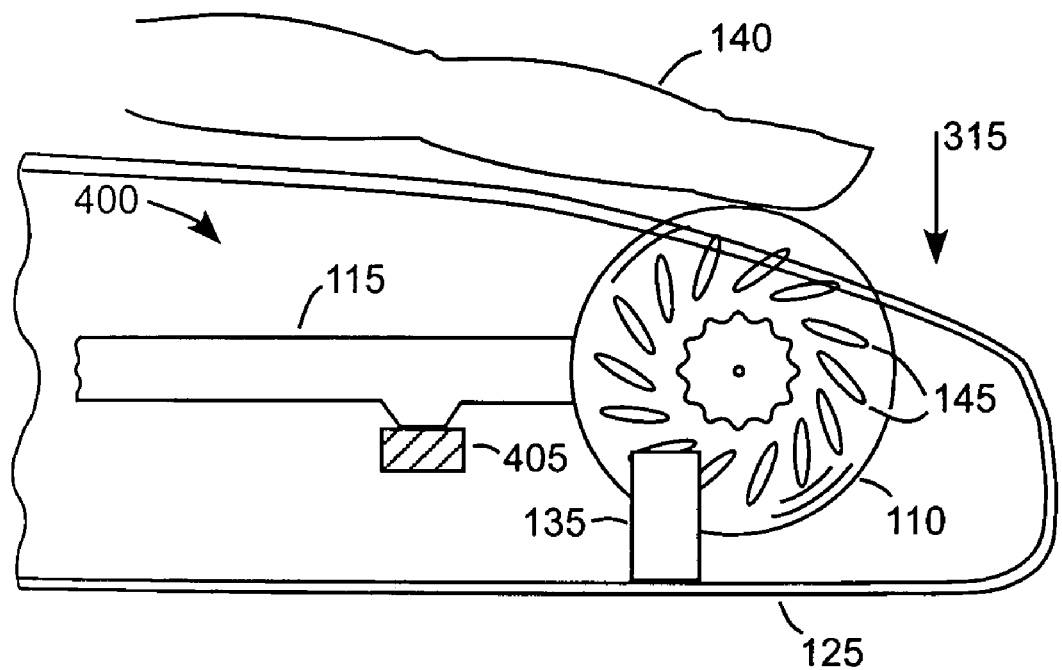
FIG. 4 is a simplified schematic of a roller device according to another embodiment of the present invention.

FIG. 4 is a simplified schematic of a roller device 400 according to another embodiment of the present invention. Roller device 400 differs from roller devices described above in that roller device 400 includes a force detection device 405 that might replace switch 120 or might be used in conjunction with switch 120. In the particular embodiment shown in FIG. 4, force detection device 405 replaces switch 120. Force detection device 405 is configured to detect forces placed on the roller wheel by a user. The force detection device may be piezoelectric device, a capacitive device, a piezoresistivity device, such as a piezoresistivity conductive polymer that changes resistance in a predictable manner with the application of a force at its surface, such as the Force Sensing Resistors™ of Interlink Electronics of Carpinteria Calif., or other similarly functioning detection devices. If a first force, included in a first range of forces, is detected on the roller wheel, the force detection device may configure encoder 135 to control scrolling of graphical objects along a first axis (e.g., y-axis) of a monitor. If the force detection device detects a force larger than the first force and up to and including a second force, the force detection device may configure encoder 135 to control scrolling along a second axis (e.g., x-axis) of the monitor. According to a further embodiment, if a third force, larger than the second force, is detected by the force sensing device, the force sensing device configures an input device to change a first operational characteristic to a second operational characteristic. The change of such operational characteristics is described above in detail.

Figure 5:
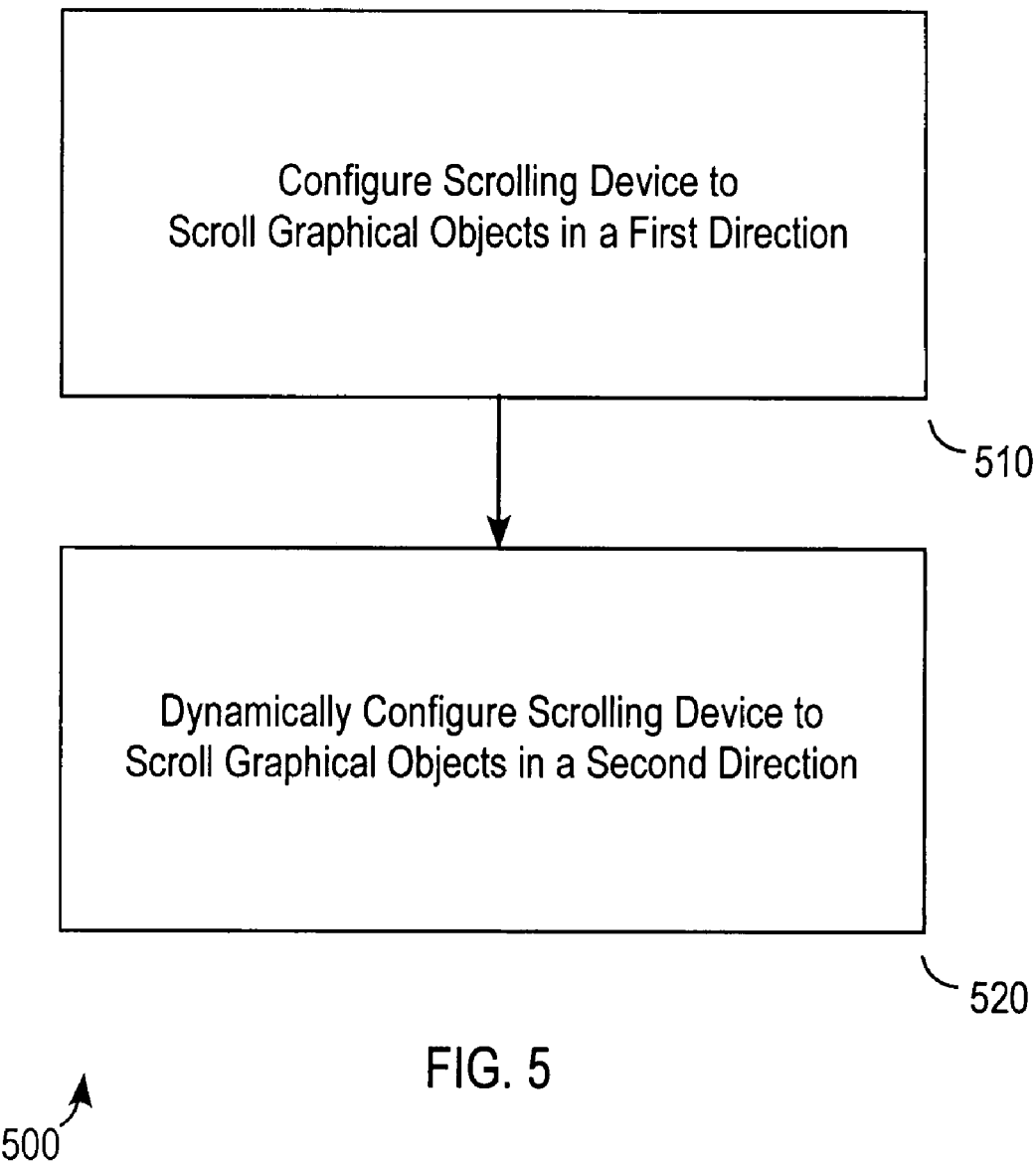
FIG. 5 is a high-level flow chart having steps for controlling scrolling of graphical objects in a first direction and a second direction.

FIG. 5 is a high-level flow chart having steps for dynamically switching between scrolling a graphical object along a first axis (e.g., vertical axis) of a monitor and a second axis (e.g., horizontal axis) of the monitor. The high-level flowchart is merely illustrative of an embodiment incorporating the present invention and does not limit the scope of the invention as recited in the claims. One of ordinary skill in the art would recognize variations, modifications, and alternatives. At 500, switch 120 in a first state configures encoder 135 to scroll a graphical object in the first direction. The graphical object is scrolled along the first axis by a user rotating roller wheel 110 with the switch in the first state. The first axis may include the upward and downward directions (or vertical directions) of a monitor, such as a computer monitor on which the graphical object is displayed. The graphical object may include any graphical object that may be scrolled on a monitor, such as text pages, web pages diagrams, schematics, figures and the like. The switch's first state may be a default switch state. The switch may assume the default switch state during power up of the input device. At 510, switch 120 in a second state configures encoder 135 to scroll the graphical object along a second axis different than the first axis. The switch may be activated in its second state by a user pressing down on the roller wheel and releasing the roller wheel or by pressing down on the roller wheel and maintaining the downward force on the roller wheel. The second axis may include the left and right directions of the monitor. The graphical object is scrolled in the second direction by a user rotating the roller wheel with the switch in the second state.

The above-described arrangements of apparatus and methods are merely illustrative of applications of the principles of this invention and many other embodiments and modifications may be made without departing from the spirit and scope of the invention as defined in the claims. For example, an input device, such as a mouse, that is configured to include the roller device described above may also include control buttons disposed, for example on the left and right sides of the roller device. The control buttons may be configured for traditional selection processes. The mouse may include additional x-y controllers, such as optical x-y sources, detectors and encoders or roller balls and their associated detectors and encoders, which may be configured for traditional x-y control of graphical objects. Additionally, while the roller devices are shown in the figures and described above as including a cantilevered arm on which a roller wheel is mounted, the roller wheels may be mounted on a variety of support structures configured to support the roller wheel and provide for depressing the roller wheel to activate the one or more switches and/or a force sensing device. The scope of the invention should, therefore, be determined not with reference to the above description, but instead should be determined with reference to the appended claims along with their full scope of equivalents.

What is claimed is:

1. An input device comprising:
   a roller wheel configured to be rotated by a user;
   an encoder configured to encode rotations of the roller wheel;
   a first sensor coupled to the roller wheel, wherein the first sensor is configured to control the encoder to scroll a graphical object along a first axis if the first sensor is in a first state, and the first sensor is configured to control the encoder to scroll the graphical object along a second axis if the first sensor is in a second state; and
   a second sensor configured to change an operational characteristic of the input device from a first characteristic to a second characteristic if the second sensor is activated by the user pressing on the roller wheel, wherein the second sensor has a first state and a second state, and wherein the first mentioned sensor is configured to enter its second state if the roller wheel is pressed down a first distance by the user, and the second sensor is configured to enter its second state if the roller wheel is pressed down a second distance greater than the first distance.

2. The input device of claim 1, wherein the first axis and second axis are in different direction.

3. The input device of claim 1, wherein the first axis is a vertical axis of a monitor, and the second axis is a horizontal axis of the monitor.

4. The input device of claim 1, wherein the sensor is configured to be in the first state if a user presses on the roller wheel with a first force.

5. The input device of claim 4, wherein the sensor is configured to be in the second state if the user presses on the roller wheel with a second force greater than the first force.

6. The input device of claim 1, wherein the sensor is configured to change an operational characteristic of the input device from a first characteristic to a second characteristic if the user presses the roller wheel with a third force greater than the second force.

7. The input device of claim 6, wherein the first characteristic includes x-y control and the second characteristic includes scrolling.

8. The input device of claim 6, wherein the second characteristic includes at least one of scrolling, selection of a graphical object, highlighting, menu selection, and a user configurable function.

9. The input device of claim 8, further comprising an x-y controller.

10. The input device of claim 9, wherein the x-y controller is configured to provide the first characteristic and the second characteristic.

11. The input device of claim 1, wherein the graphical objects are configured to be displayed on a monitor.

12. The input device of claim 11, wherein the monitor is a computer monitor.

13. The input device of claim 1, wherein the sensor is a button device.

14. The input device of claim 1, wherein the sensor is a force detection device.

15. The input device of claim 14, wherein the force detection device is at least one of piezoelectric device, a capacitive device, a piezoresistivity conductive polymer device.

16. The input device of claim 14, wherein the force detection device is configured to detect a force placed on the roller wheel by the user, and the roller wheel is configured not to depress under the force.

17. The input device of claim 1, wherein the first sensor is a first button device, and the second sensor is a second button device.

18. The input device of claim 1, wherein the first sensor is a first switch device, and the second sensor is a second switch device.

19. The input device of claim 1, wherein the first characteristic includes x-y control and the second characteristic includes scrolling.

20. The input device of claim 1, wherein the second characteristic includes at least one of scrolling, selection of a graphical object, highlighting, menu selection, and a user configurable function.

21. The input device of claim 20, further comprising an x-y controller configured to provide the first characteristic and the second characteristic.

22. An input device comprising:
    a roller wheel configured to be rotated by a user;
    an encoder configured to encode rotations of the roller wheel; and
    a force detection device coupled to the roller wheel, wherein the force detection device is configured to control the encoder to scroll a graphical object along a first axis if the force detection device detects a first force in a first range of forces, and the force detection device is configured to control the encoder to scroll a graphical object along a second axis if the force detection device detects a second force in a second-range of forces, wherein the forces in the first range of forces is greater than the forces in the second range of forces.

23. The input device of claim 22, wherein the first axis and second axis are in different directions.

24. The input device of claim 22, wherein the first axis is a vertical axis of a monitor, and the second axis is a horizontal axis of the monitor.

* * * * *